United States Patent
Tojyo

[11] 4,208,099
[45] Jun. 17, 1980

[54] MICROSCOPE OBJECTIVE LENS SYSTEM

[75] Inventor: Tsutomu Tojyo, Hachiouji, Japan

[73] Assignee: Olympus Optical Company Limited, Tokyo, Japan

[21] Appl. No.: 883,669

[22] Filed: Mar. 6, 1978

[30] Foreign Application Priority Data

Mar. 14, 1977 [JP] Japan .................. 52-26969

[51] Int. Cl.² .............................. G02B 21/02
[52] U.S. Cl. ............................ 350/175 ML
[58] Field of Search ................... 350/175 ML

[56] References Cited
U.S. PATENT DOCUMENTS 3,428,389  2/1969  Judd ................ 350/175 ML
3,879,111  4/1975  Goto ................ 350/175 ML
3,902,793  9/1975  Shoemaker ........... 350/175 ML Primary Examiner—Conrad J. Clark
Attorney, Agent, or Firm—Cushman, Darby & Cushman

[57] ABSTRACT

A microscope objective lens system which comprises a front and a rear lens group, the former comprising a first positive meniscus lens component, a second positive lens component, a third positive cemented lens component and a fourth positive cemented lens component, and the latter comprising a fifth cemented lens component, the system enabling to achieve the flattening of an image plane widely towards the surrounding area of visual field.

6 Claims, 6 Drawing Figures

MICROSCOPE OBJECTIVE LENS SYSTEM

BACKGROUND OF THE INVENTION (a) Field of the Invention

The present invention relates to a microscope objective lens system and more particularly to an achromatic microscope objective lens system having a flat field.

(b) Description of the Prior Art

In a conventional microscope objective lens system of this type, although an image plane was flat, it was not sufficiently flat to the surrounding area of the visual field and only in the vicinity of the central portion was there a flat image plane. Further, when the image plane was flat over a comparatively large area, the numerical aperture was small.

SUMMARY OF THE INVENTION

It is therefore an object of the present invention to provide a microscope objective lens system which achieves the flattening of an image plane extended further towards the surrounding area of the visual field as compared with conventional systems and wherein the numerical aperture is as large as N.A=0.7 with an excellent resolving power and with magnification in the order of 40 times.

The objective lens system according to the present invention comprises a front lens group comprising a first lens component of a positive meniscus lens having its concave surface faced to the object side, a second lens component of a positive lens, a third lens component of a positive cemented lens, and a fourth lens component of a positive cemented lens, and a rear lens group comprising a fifth lens component of a cemented lens having its concave surface faced to the image side, these lens components being arranged one after another from the object side. This lens system satisfies each of the conditions enumerated below:

(1) $-0.05 \leq f_1/f_2 \leq 0.05$
(2) $1.3 \leq r_2/r_1 \leq 1.75$
(3) $70 \leq [(\nu_4 - \nu_3) + (\nu_6 - \nu_5)] \leq 90$
(4) $\theta_7 - \theta_8)/(\nu_8 - \nu_7) \leq 0.005$ wherein the reference symbols $f_1$ and $f_2$ represent equivalent focal lengths of the front lens group and the rear lens group, respectively, $r_1$ and $r_2$ represent radii of curvature of the surface on the object side and the surface on the image side of the first lens component, respectively, $\nu_3$, $\nu_4$, $\nu_5$, $\nu_6$, $\nu_7$ and $\nu_8$ represent Abbe's numbers of both the lenses of the third lens component, both the lenses of the fourth lens component and both the lenses of the fifth lens component, respectively, and $\theta_7$ and $\theta_8$ represent $\theta$ defined by $\theta = (n_g - n_F)/(n_F - n_c)$ of both the lenses of the fifth lens component, respectively.

In the objective lens system according to the present invention, the power of the rear lens group is made low and, therefore, the condition (1) is established in order to adjust the curvature of field and comatic aberration. In the condition (1), when $f_1/f_2$ exceeds the upper limit, that is, the power of the rear lens group becomes high at the positive value, the curvature of field is overcorrected and the asymmetrical character of coma is markedly aggravated. Moreover, there arises a great difficulty in correcting spherical aberration. Further, when $f_1/f_2$ exceeds the lower limit of the condition (1), that is, the power of the rear lens group becomes strong at the negative value, the curvature of field is aggravated and chromatic aberration increases to that correction of the chromatic aberration and of the spherical aberration becomes difficult.

Next, the condition (2) is for determining a refracting power of the concave meniscus lens of the first lens component. This condition is necessary in order to correct the Petzval's sum, to eliminate the curvature of field and thereby to correct the spherical aberration and the comatic aberration of the entire system. Above the upper limit of the condition (2), curvature of field is overcorrected and comatic aberration caused by spherical aberration of oblique ray flux is undercorrected. On the contrary, below the lower limit, curvature of field becomes overcorrected.

The condition (3) is for determining the total dispersion differences in the achromatic lenses of the front lens group and this maintains the balance between longitudinal chromatic aberration and lateral chromatic aberration of the entire system. Above the upper limit of the condition (3), when lateral chromatic aberration is sufficiently corrected, marginal rays of longitudinal chromatic aberration of short-wavelength rays are overcorrected and, therefore, these come out on the image as flares thereby aggravating contrast in the image. Below the lower limit of the condition (3), when longitudinal chromatic aberration is sufficiently corrected, the amount of undercorrection of lateral chromatic aberration becomes too great.

The condition (4) is for decreasing a secondary spectrum of chromatic aberration which markedly hinders the central resolution. That is, by using as the convex lens a glass having a high partial dispersion rate and using as the concave lens a glass having a small partial dispersion rate for the fifth lens component, the secondary spectrum of chromatic aberration is made low so that an adverse effect on the image is avoided. Outside of the condition (4), it is not possible to decrease the secondary spectrum.

Further, the objective lens of the present invention may be improved by applying the following respective conditions in addition to the conditions explained herein above.

(5) $1.4 \leq |r_{10}/r_{11}| \leq 2.5$
(6) $1.3 \leq |r_{11}/r_{13}| \leq 1.8$
(7) $-0.2 \leq (n_2-1)/(r_3) \cdot f \leq 0.03$
(8) $-0.1 \leq (n_5-1)/r_8 \cdot f \leq 0.1$
(9) $0.35f < (d_1)/(n_1) + d_2 < f$ wherein the reference symbol $f$ represents a focal length of the entire system, $r_3$, $r_8$, $r_{10}$, $r_{11}$ and $r_{13}$ represent radii of curvature of the surface on the object side of the second lens component, the surface on the object side and the surface on the image side of the fourth lens component and the surface on the object side and the surface on the image side of the fifth lens component, respectively, $d_1$ represents a thickness of the first lens component, $d_2$ represents an airspace between the first lens component and the second lens component, and $n_1$, $n_2$, and $n_5$ represent refractive indices of the first lens component, the second lens component and the lens on the object side of the fourth lens component, respectively.

Among the above mentioned conditions, the conditions (5) and (6) are necessary for correction the Petzval's sum and for eliminating curvature of field and astigmatic difference and, when $|r_{10}/r_{11}|$ and $|r_{11}/r_{13}|$ exceed the upper limits of these respective conditions, the curvature of field is overcorrected and the zonal spherical aberration caused by spherical aberration of oblique ray flux is increased. Below the lower limits, curvature of field and astigmatic difference are undercorrected. Further, the conditions (7) and (8) are to adjust astigmatic difference and to eliminate asymmetrical coma and, when $(n_2-1)/r_3 \cdot f$ and $(n_5-1)/r_8 \cdot f$ exceed the upper limits of the respective conditions, astigmatic difference is undercorrected and asymmetrical coma caused by inward coma is increased. Below the lower limits, astigmatic difference is overcorrected and asymmetrical coma caused by outward coma is increased. The condition (9) together with the conditions (1), (2), (5), (6), (7) and (8) is effective for further improving the curvature of field and comatic aberration. Above the upper limit of this condition (9), the curvature of field is undercorrected and comatic aberration caused by oblique ray flux is overcorrected. Below the lower limit of this condition, curvature of field is overcorrected and comatic aberration is undercorrected.

DESCRIPTION OF THE PREFERRED EMBODIMENTS

Figure 1:
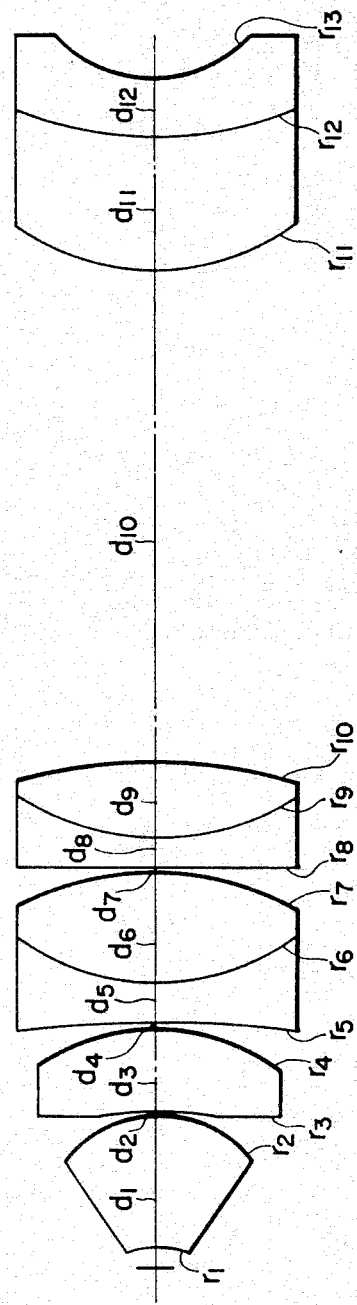
FIG. 1 shows a sectional view illustrating the composition of the microscope objective lens system according to the present invention.
Figure 2:
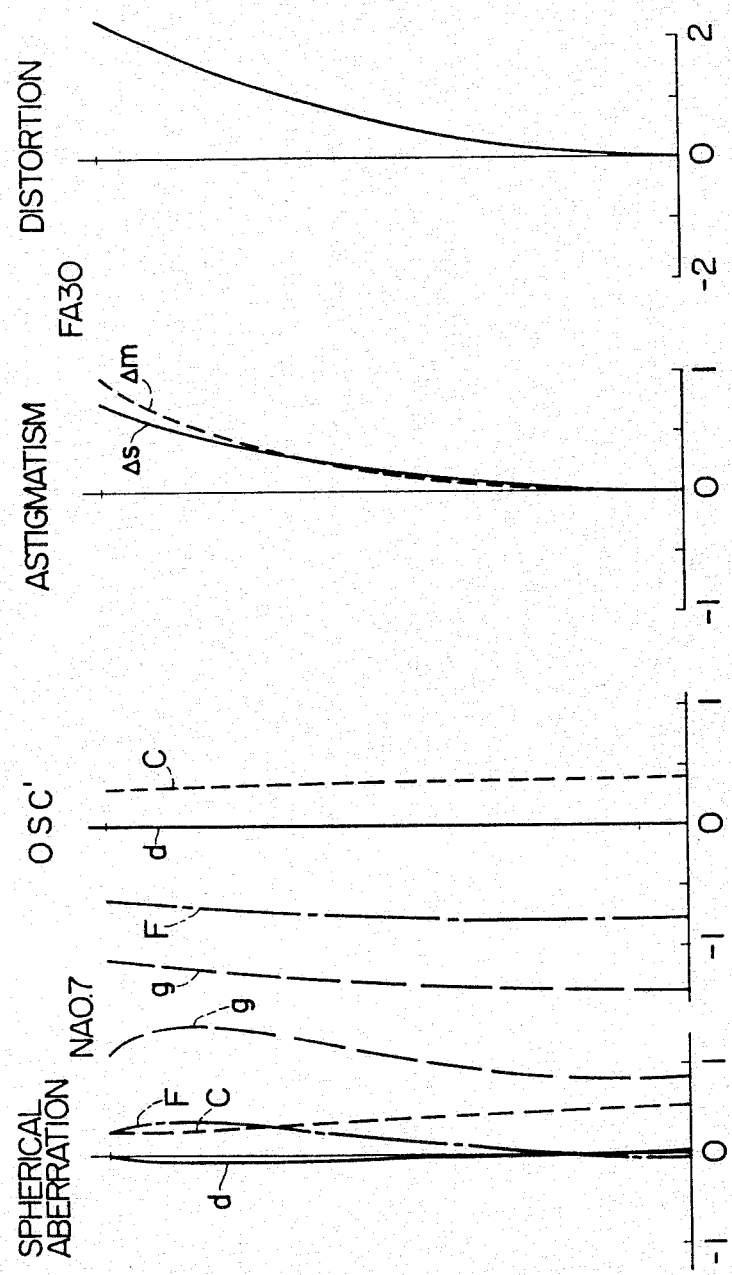
FIG. 2 illustrates curves showing the aberration characteristics of the Embodiment 1.
Figure 3:
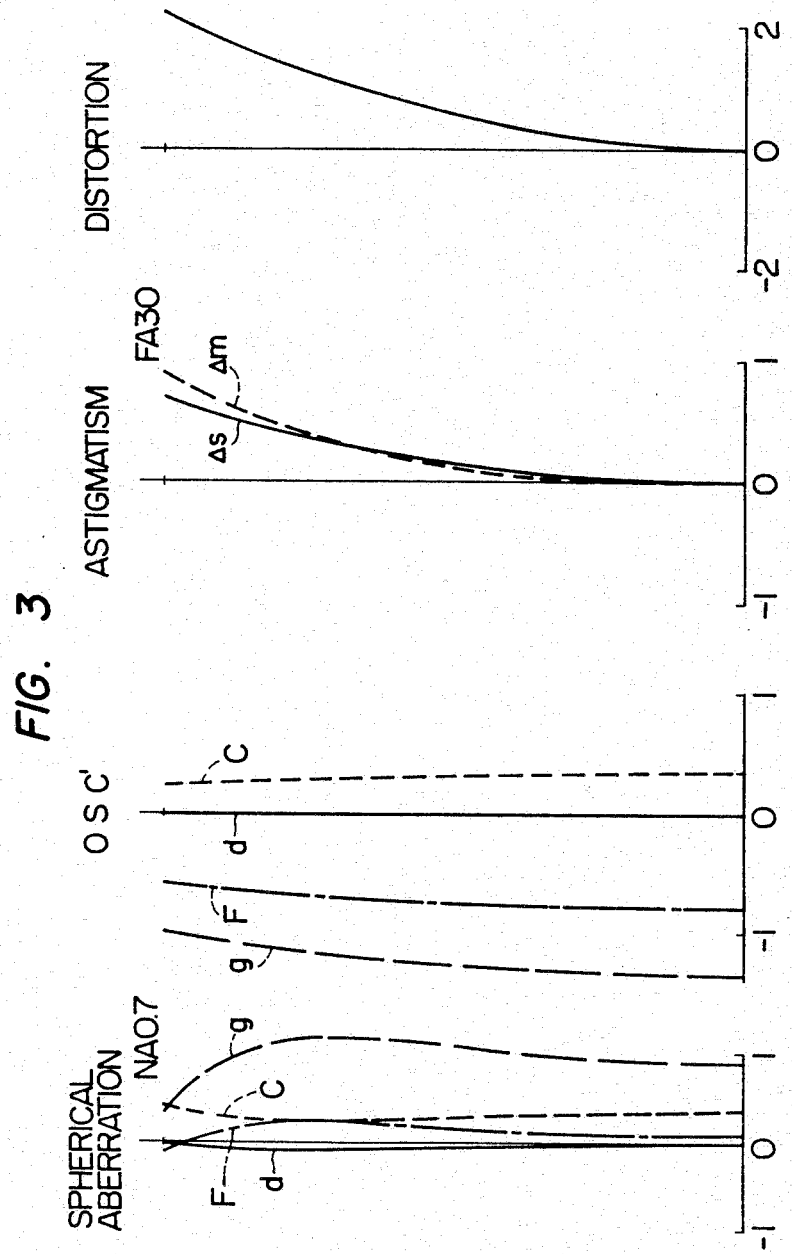
FIG. 3 illustrates curves showing the aberration characteristics of the Embodiment 2.
Figure 4:
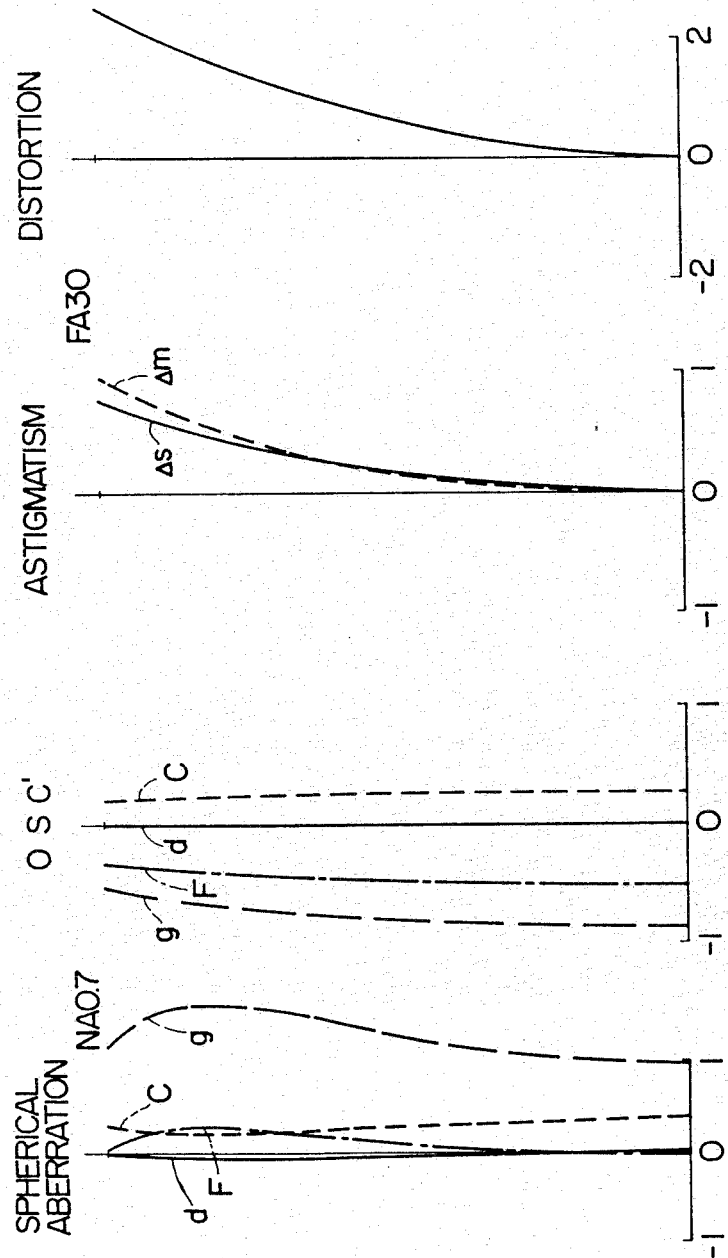
FIG. 4 illustrates curves showing the aberration characteristics of the Embodiment 3.
Figure 5:
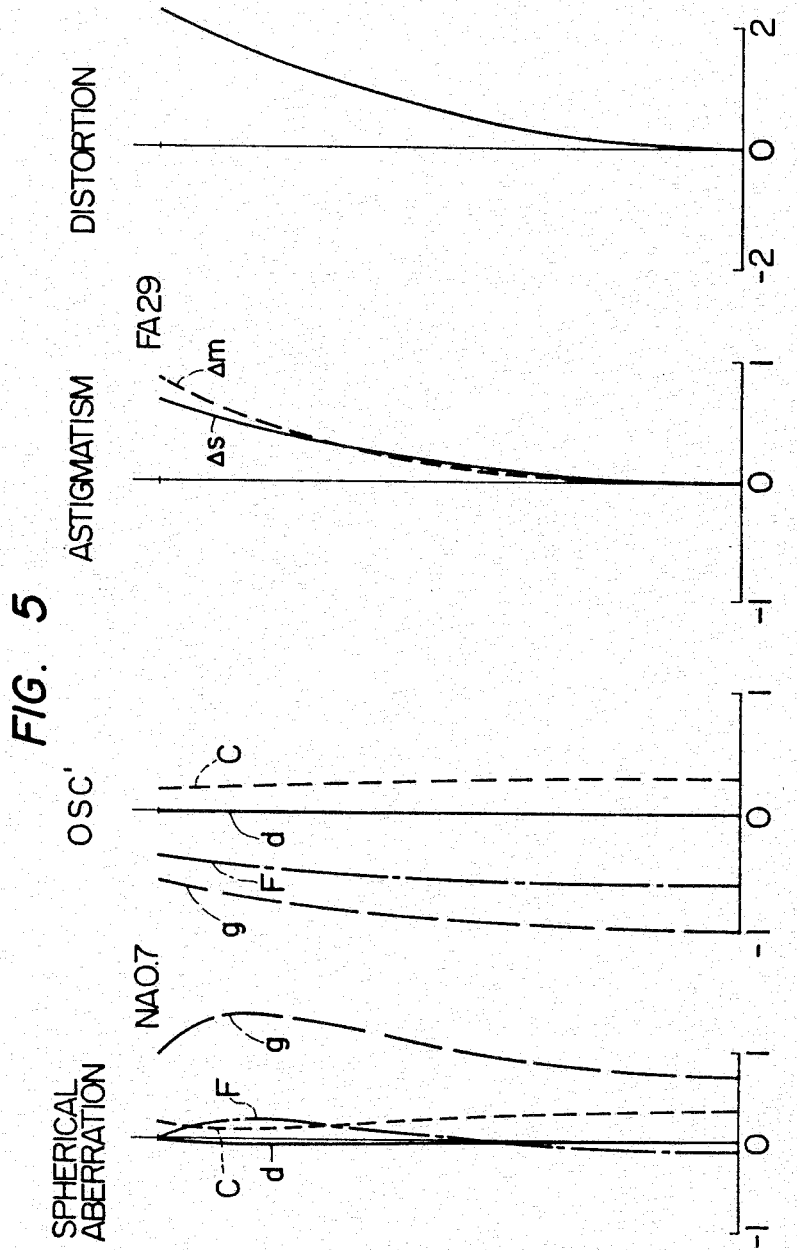
FIG. 5 illustrates curves showing the aberration characteristics of the Embodiment 4.
Figure 6:
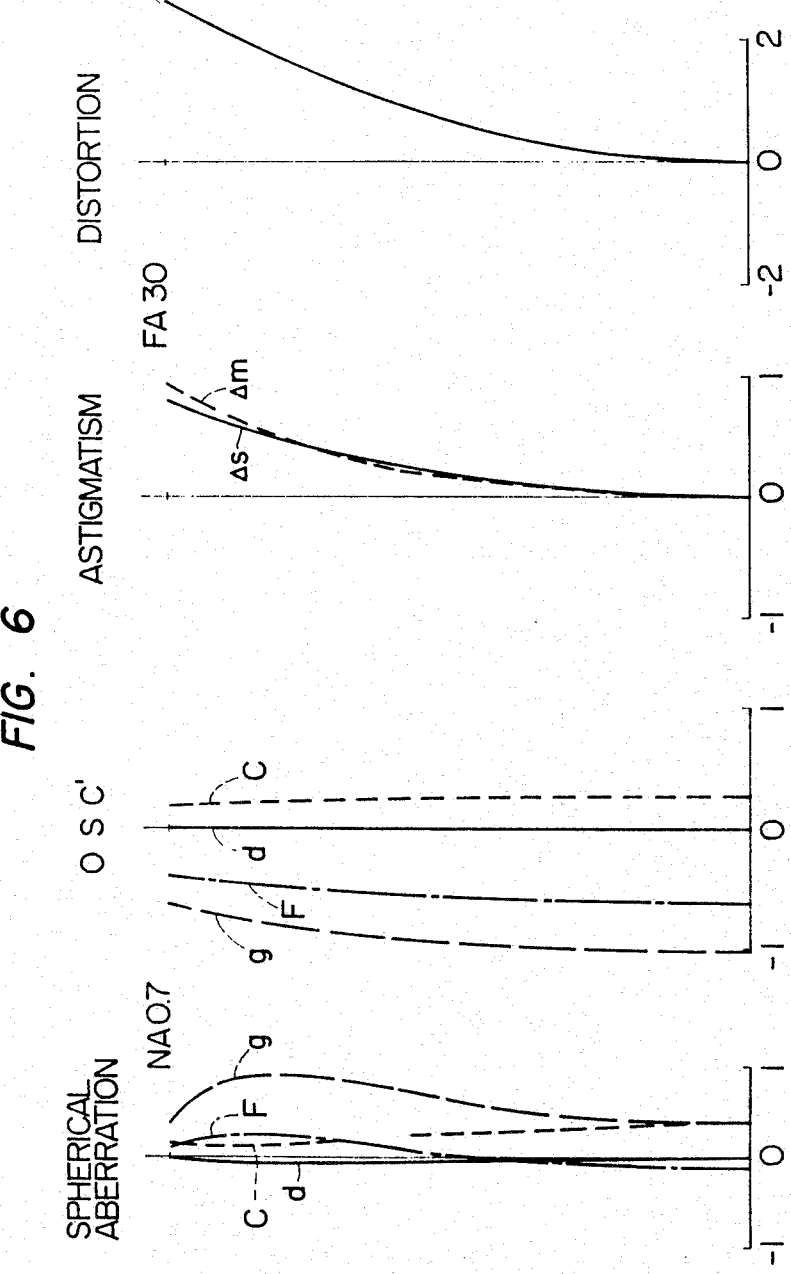
FIG. 6 illustrates curves showing the aberration characteristics of the Embodiment 5.

Now, some preferred embodiments of the present invention relating to the microscope objective lens system as described above are given below:

| Embodiment 1 | | | |
|---|---|---|---|
| $f = 1.0$ | $\beta = 40X$, | $N.A = 0.7$, | $W.D = 0.1657$ |
| $r_1 = -0.6362$ | | | |
| | $d_1 = 1.0847$ | $n_1 = 1.78472$ | $\nu_1 = 25.71$ |
| $r_2 = -1.0336$ | | | |
| | $d_2 = 0.0246$ | | |
| $r_3 = -15.5604$ | | | |
| | $d_3 = 0.7229$ | $n_2 = 1.497$ | $\nu_2\ 81.60$ |
| $r_4 = -1.7302$ | | | |
| | $d_4 = 0.0246$ | | |
| $r_5 = -8.6105$ | | | |
| | $d_5 = 0.2997$ | $n_3 = 1.5213$ | $\nu_3 = 52.55$ |
| $r_6 = 1.8391$ | | | |
| | $d_6 = 0.9229$ | $n_4 = 1.497$ | $\nu_4 = 81.60$ |
| $r_7 = -2.6282$ | | | |
| | $d_7 = 0.0345$ | | |
| $r_8 = 75.5106$ | | | |
| | $d_8 = 0.2462$ | $n_5 = 1.7847$ | $\nu_5 = 26.22$ |
| $r_9 = 2.3155$ | | | |
| | $d_9 = 0.6402$ | $n_6 = 1.497$ | $\nu_6 = 81.60$ |
| $r_{10} = -3.7586$ | | | |
| | $d_{10} = 3.9990$ | | |
| $r_{11} = 2.0982$ | | | |
| | $d_{11} = 1.0746$ | $n_7 = 1.783$ | $\nu_7 = 36.15$ |
| $r_{12} = 3.3781$ | | | |
| | $d_{12} = 0.4765$ | $n_8 = 1.6134$ | $\nu_8 = 43.84$ |
| $r_{13} = 1.2170$ | | | |
| | $f_1 = 1.504$ | $f_2 = -150.418$ | |
| | $O_7 = 0.5870$ | $O_8 = 0.5623$ | |

| Embodiment 2 | | | |
|---|---|---|---|
| $f = 1.0$, | $\beta = 40X$, | $N.A = 0.7$, | $W.D = 0.1654$ |
| $r_1 = -0.6378$ | | | |
| | $d_1 = 1.1615$ | $n_1 = 1.78472$ | $\nu_1 = 25.71$ |
| $r_2 = -1.0741$ | | | |
| | $d_2 = 0.0246$ | | |
| $r_3 = -22.5264$ | | | |
| | $d_3 = 0.7707$ | $n_2 = 1.497$ | $\nu_2 = 81.60$ |
| $r_4 = -1.8590$ | | | |
| | $d_4 = 0.0246$ | | |
| $r_5 = -80.9474$ | | | |
| | $d_5 = 0.3532$ | $n_3 = 1.52682$ | $\nu_3 = 51.12$ |
| $r_6 = 1.8277$ | | | |
| | $d_6 = 0.9712$ | $n_4 = 1.497$ | $\nu_4 = 81.60$ |
| $r_7 = -2.9691$ | | | |
| | $d_7 = 0.0344$ | | |
| $r_8 = 61.0911$ | | | |
| | $d_8 = 0.2458$ | $n_5 = 1.80518$ | $\nu_5 = 25.43$ |
| $r_9 = 2.2709$ | | | |
| | $d_9 = 0.6391$ | $n_6 = 1.497$ | $\nu_6 = 81.60$ |
| $r_{10} = -4.0145$ | | | |
| | $d_{10} = 4.0669$ | | |
| $r_{11} = 1.9044$ | | | |
| | $d_{11} = 0.9361$ | $n_7 = 1.74077$ | $\nu_7 = 27.79$ |
| $r_{12} = 2.1142$ | | | |
| | $d_{12} = 0.3427$ | $n_8 = 1.6134$ | $\nu_8 = 43.84$ |
| $r_{13} = 1.2113$ | | | |
| | $f_1 = 1.475$ | $f_2 = -44.593$ | |
| $O_7 = 0.6060$ | $O_8 = 0.5623$ | | |

| Embodiment 3 | | | |
|---|---|---|---|
| $f = 1.0$, | $\beta = 40X$, | $N.A = 0.7$, | $W.D = 0.1638$ |
| $r_1 = -0.5898$ | | | |
| | $d_1 = 1.0492$ | $n_1 = 1.78472$ | $\nu_1 = 25.71$ |
| $r_2 = -1.0096$ | | | |
| | $d_2 = 0.0243$ | | |
| $r_3 = -14.0057$ | | | |
| | $d_3 = 0.6459$ | $n_2 = 1.4925$ | $\nu_2 = 81.90$ |
| $r_4 = -1.6253$ | | | |
| | $d_4 = 0.0243$ | | |
| $r_5 = -38.5954$ | | | |
| | $d_5 = 0.2779$ | $n_3 = 1.5213$ | $\nu_3 = 52.55$ |
| $r_6 = 1.7252$ | | | |
| | $d_6 = 0.8951$ | $n_4 = 1.4925$ | $\nu_4 = 81.90$ |
| $r_7 = -2.6818$ | | | |
| | $d_7 = 0.0341$ | | |
| $r_8 = -276.8809$ | | | |
| | $d_8 = 0.2434$ | $n_5 = 1.80518$ | $\nu_5 = 25.43$ |
| $r_9 = 2.2340$ | | | |
| | $d_9 = 0.6328$ | $n_6 = 1.4925$ | $\nu_6 = 81.90$ |
| $r_{10} = -3.4057$ | | | |
| | $d_{10} = 3.9883$ | | |
| $r_{11} = 1.9127$ | | | |
| | $d_{11} = 0.9450$ | $n_7 = 1.72342$ | $\nu_7 = 37.95$ |
| $r_{12} = 6.4511$ | | | |
| | $d_{12} = 0.3432$ | $n_8 = 1.61484$ | $\nu_8 = 51.17$ |
| $r_{13} = 1.1849$ | | | |
| | $f_1 = 1.421$ | $f_2 = -161.569$ | |
| | $O_7 = 0.5835$ | $O_8 = 0.5573$ | |

| Embodiment 4 | | | |
|---|---|---|---|
| $f = 1.0$, | $\beta = 40X$, | $N.A = 0.7$, | $W.D = 0.1638$ |
| $r_1 = -0.5775$ | | | |
| | $d_1 = 1.0304$ | $n_1 = 1.78472$ | $\nu_1 = 25.71$ |
| $r_2 = -0.9776$ | | | |
| | $d_2 = 0.0243$ | | |
| $r_3 = -127.6624$ | | | |
| | $d_3 = 0.6167$ | $n_2 = 1.4925$ | $\nu_2 = 81.90$ |
| $r_4 = -1.6702$ | | | |
| | $d_4 = 0.0243$ | | |
| $r_5 = -13.3607$ | | | |
| | $d_5 = 0.2872$ | $n_3 = 1.5213$ | $\nu_3 = 52.55$ |
| $r_6 = 1.6493$ | | | |

-continued

Embodiment 4

| | | | |
|---|---|---|---|
| $r_7 = -2.6376$ | $d_6 = 0.9031$ | $n_4 = 1.4925$ | $v_4 = 81.90$ |
| $r_8 = -149.0899$ | $d_7 = 0.0341$ | | |
| $r_9 = 2.1982$ | $d_8 = 0.2434$ | $n_5 = 1.80518$ | $v_5 = 25.43$ |
| $r_{10} = -3.2426$ | $d_9 = 0.6328$ | $n_6 = 1.4925$ | $v_6 = 81.90$ |
| $r_{11} = 1.9263$ | $d_{10} = 3.9939$ | | |
| $r_{12} = 5.6938$ | $d_{11} = 0.9516$ | $n_7 = 1.7495$ | $v_7 = 35.27$ |
| $r_{13} = 1.1734$ | $d_{12} = 0.3517$ | $n_8 = 1.6134$ | $v_8 = 43.84$ |
| | $f_1 = 1.412$ | $f_2 = 3360.713$ | |
| | $\theta_7 = 0.5885$ | $\theta_8 = 0.5623$ | |

Embodiment 5

| $f = 1.0$, | $\beta = 40X$, | $N.A = 0.7$, | $W.D = 0.1629$ |
|---|---|---|---|
| $r_1 = -0.5879$ | | | |
| $r_2 = -0.9712$ | $d_1 = 1.1268$ | $n_1 = 1.78472$ | $v_1 = 25.71$ |
| $r_3 = -3.4741$ | $d_2 = 0.0242$ | | |
| $r_4 = -1.7216$ | $d_3 = 0.5324$ | $n_2 = 1.497$ | $v_2 = 81.60$ |
| $r_5 = 3.4827$ | $d_4 = 0.0242$ | | |
| $r_6 = 1.4761$ | $d_5 = 0.3555$ | $n_3 = 1.5213$ | $v_3 = 52.55$ |
| $r_7 = -2.7742$ | $d_6 = 0.9526$ | $n_4 = 1.497$ | $v_4 = 81.60$ |
| $r_8 = -15.9252$ | $d_7 = 0.0339$ | | |
| $r_9 = 1.6468$ | $d_8 = 0.2420$ | $n_5 = 1.7847$ | $v_5 = 26.22$ |
| $r_{10} = -4.3063$ | $d_9 = 0.6292$ | $n_6 = 1.497$ | $v_6 = 81.60$ |
| $r_{11} = 1.9340$ | $d_{10} = 4.0024$ | | |
| $r_{12} = -80.2098$ | $d_{11} = 0.9124$ | $n_7 = 1.7495$ | $v_7 = 35.27$ |
| $r_{13} = 1.1830$ | $d_{12} = 0.2986$ | $n_8 = 1.6134$ | $v_8 = 43.84$ |
| | $f_1 = 1.332$ | $f_2 = 79.840$ | |
| | $\theta_7 = 0.5885$ | $\theta_8 = 0.5623$ | | wherein the reference symbols f represents a focal length, $\beta$ represents a lateral magnification, N.A. represents a numerical aperture, W.D. represents a working distance, $r_1$ through $r_{13}$ represent radii of curvature of the respective surfaces of the lens, $d_1$ represents thickness of the respective lenses and air spaces therebetween, $n_1$ through $n_8$ represent refractive indices of the respective lenses and $v_1$ through $v_8$ represent Abbe's numbers of the respective lenses.

I claim:

1. A microscope objective lens system comprising a front lens group comprising a first lens component of a positive meniscus lens having its concave surface faced to the object side, a second lens component of a positive lens, a third lens component of a positive cemented lens, and a fourth lens component of a positive cemented lens, and a rear lens group comprising a fifth lens component of a cemented lens having its concave surface faced to the image side, and said lens system satisfying the following conditions:

(1) $-0.05 \leq f_1/f_2 \leq 0.05$
(2) $1.3 \leq r_2/r_1 \leq 1.75$
(3) $70 \leq [(v_4-v_3)+(v_6-v_5)] \leq 90$
(4) $(\theta_7-\theta_8)/(v_8-v_7) \leq 0.005$
(5) $1.68 < |r_{10}/r_{11}| \leq 2.5$
(6) $1.57 \leq |r_{11}/r_{13}| \leq 1.8$
(7) $-0.2 \leq (n_2-1)/(r_3) \cdot f \leq 0.03$
(8) $-0.1 \leq (n_5-1)/(r_8) \cdot f \leq 0.1$
(9) $0.6f < (d_1/n_1) + d_2 < f$ wherein the reference symbols $f_1$ and $f_2$ represent equivalent focal lengths of the front lens group and the rear lens group, respectively, $r_1$ and $r_2$ represent radii of curvature of the surface on the object side and the surface on the image side of the first lens component, respectively, $v_3$, $v_4$, $v_5$, $v_6$, $v_7$ and $v_8$ represent Abbe's numbers of both the lenses of the third lens component, both the lenses of the fourth lens component and both the lenses of the fifth lens component, respectively, $\theta_7$ and $\theta_8$ represent $\theta$ defined by $\theta=(n_g-n_F)/(n_F-n_c)$ of both the lenses of the fifth lens component, respectively, the reference symbol f represents a focal length of the entire system, $r_3$, $r_8$, $r_{10}$, $r_{11}$ and $r_{13}$ represent radii of curvature of the surface on the object side of the second lens component, the surface on the object side and the surface on the image side of the fourth lens component and the surface on the object side and the surface on the image side of the fifth lens component, respectively, $d_1$ represents a thickness of the first lens component, $d_2$ represents an airspace between the first lens component and the second lens component, and $n_1$, $n_2$ and $n_5$ represent refractive indices of the first lens component, the second lens component and the lens on the object side of the fourth lens component, respectively.

2. A microscope objective lens system according to claim 2 having the following numerical data:

| $f = 1.0$, | $\beta = 40X$, | $N.A = 0.7$, | $W.D = 0.1657$ |
|---|---|---|---|
| $r_1 = -0.6362$ | | | |
| $r_2 = -1.0336$ | $d_1 = 1.0847$ | $n_1 = 1.78472$ | $v_1 = 25.71$ |
| $r_3 = -15.5604$ | $d_2 = 0.0246$ | | |
| $r_4 = -1.7302$ | $d_3 = 0.7229$ | $n_2 = 1.497$ | $v_2 = 81.60$ |
| $r_5 = -8.6105$ | $d_4 = 0.0246$ | | |
| $r_6 = 1.8391$ | $d_5 = 0.2997$ | $n_3 = 1.5213$ | $v_3 = 52.55$ |
| $r_7 = -2.6282$ | $d_6 = 0.9229$ | $n_4 = 1.497$ | $v_4 = 81.60$ |
| $r_8 = 75.5106$ | $d_7 = 0.0345$ | | |
| $r_9 = 2.3155$ | $d_8 = 0.2462$ | $n_5 = 1.7847$ | $v_5 = 26.22$ |
| $r_{10} = -3.7586$ | $d_9 = 0.6402$ | $n_6 = 1.497$ | $v_6 = 81.60$ |
| $r_{11} = 2.0982$ | $d_{10} = 3.9990$ | | |
| $r_{12} = 3.3781$ | $d_{11} = 1.0746$ | $n_7 = 1.783$ | $v_7 = 36.15$ |
| $r_{13} = 1.2170$ | $d_{12} = 0.4765$ | $n_8 = 1.6134$ | $v_8 = 43.84$ |
| | $f_1 = 1.504$ | $f_2 = -150.418$ | |
| | $\theta_7 = 0.5870$ | $\theta_8 = 0.5623$ | | wherein the reference symbol f represents a focal length of the entire system, $r_1$ through $r_{13}$ represent radii of curvature of the respective surfaces of the lens component, $d_1$ through $d_{12}$ represent thicknesses of the respective lens elements and the airspaces therebetween, $n_1$ through $n_8$ represent refractive indices of the respective lens elements and $v_1$ through $v_8$ represent Abbe's numbers of the respective lens elements.

3. A microscope objective lens system according to claim 1 having the following numerical data:

| f = 1.0, | β = 40X, | N.A = 0.7, | W.D = 0.1654 |
|---|---|---|---|
| $r_1 = -0.6378$ | | | |
| | $d_1 = 1.1615$ | $n_1 = 1.78472$ | $\nu_1 = 25.71$ |
| $r_2 = -1.0741$ | | | |
| | $d_2 = 0.0246$ | | |
| $r_3 = -22.5264$ | | | |
| | $d_3 = 0.7707$ | $n_2 = 1.497$ | $\nu_2 = 81.60$ |
| $r_4 = -1.8590$ | | | |
| | $d_4 = 0.0246$ | | |
| $r_5 = -80.9474$ | | | |
| | $d_5 = 0.3532$ | $n_3 = 1.52682$ | $\nu_3 = 51.12$ |
| $r_6 = 1.8277$ | | | |
| | $d_6 = 0.9712$ | $n_4 = 1.497$ | $\nu_4 = 81.60$ |
| $r_7 = -2.9691$ | | | |
| | $d_7 = 0.0344$ | | |
| $r_8 = 61.0911$ | | | |
| | $d_8 = 0.2458$ | $n_5 = 1.80518$ | $\nu_5 = 25.43$ |
| $r_9 = 2.2709$ | | | |
| | $d_9 = 0.6391$ | $n_6 = 1.497$ | $\nu_6 = 81.60$ |
| $r_{10} = -4.0145$ | | | |
| | $d_{10} = 4.0669$ | | |
| $r_{11} = 1.9044$ | | | |
| | $d_{11} = 0.9361$ | $n_7 = 1.74077$ | $\nu_7 = 27.79$ |
| $r_{12} = 2.1142$ | | | |
| | $d_{12} = 0.3427$ | $n_8 = 1.6134$ | $\nu_8 = 43.84$ |
| $r_{13} = 1.2113$ | | | |
| | $f_1 = 1.475$ | $f_2 = -44.593$ | |
| | $O_7 = 0.6060$ | $O_8 = 0.5623$ | | wherein the reference symbol f represents a focal length of the entire system, $r_1$ through $r_{13}$ represent radii of curvature of the respective surfaces of the lens component, $d_1$ through $d_{12}$ represent thicknesses of the respective lens elements and the airspaces therebetween, $n_1$ through $n_8$ represent refractive indices of the respective lens elements and $\nu_1$ through $\nu_8$ represent Abbe's numbers of the respective lens elements.

4. A microscope objective lens system according to claim 1 having the following numerical data:

| f = 1.0, | β = 40X, | N.A = 0.7, | W.D = 0.1638 |
|---|---|---|---|
| $r_1 = -0.5898$ | | | |
| | $d_1 = 1.0492$ | $n_1 = 1.78472$ | $\nu_1 = 25.71$ |
| $r_2 = -1.0096$ | | | |
| | $d_2 = 0.0243$ | | |
| $r_3 = -14.0057$ | | | |
| | $d_3 = 0.6459$ | $n_2 = 1.4925$ | $\nu_2 = 81.90$ |
| $r_4 = -1.6253$ | | | |
| | $d_4 = 0.0243$ | | |
| $r_5 = -38.5954$ | | | |
| | $d_5 = 0.2779$ | $n_3 = 1.5213$ | $\nu_3 = 52.55$ |
| $r_6 = 1.7252$ | | | |
| | $d_6 = 0.8951$ | $n_4 = 1.4925$ | $\nu_4 = 81.90$ |
| $r_7 = -2.6818$ | | | |
| | $d_7 = 0.0341$ | | |
| $r_8 = -276.8809$ | | | |
| | $d_8 = 0.2434$ | $n_5 = 1.80518$ | $\nu_5 = 25.43$ |
| $r_9 = 2.2340$ | | | |
| | $d_9 = 0.6328$ | $n_6 = 1.4925$ | $\nu_6 = 81.90$ |
| $r_{10} = -3.4057$ | | | |
| | $d_{10} = 3.9883$ | | |
| $r_{11} = 1.9127$ | | | |
| | $d_{11} = 0.9450$ | $n_7 = 1.72342$ | $\nu_7 = 37.95$ |
| $r_{12} = 6.4511$ | | | |
| | $d_{12} = 0.3432$ | $n_8 = 1.61484$ | $\nu_8 = 51.17$ |
| $r_{13} = 1.1849$ | | | |
| | $f_1 = 1.421$ | $f_2 = -161.569$ | |
| | $O_7 = 0.5835$ | $O_8 = 0.5573$ | | wherein the reference symbol f represents a focal length of the entire system, $r_1$ through $r_{13}$ represent radii of curvature of the respective surfaces of the lens component, $d_1$ through $d_{12}$ represent thicknesses of the respective lens elements and the airspaces therebetween, $n_1$ through $n_8$ represent refractive indices of the respective lens elements and $\nu_1$ through $\nu_8$ represent Abbe's numbers of the respective lens elements.

5. A microscope objective lens system according to claim 1 having the following numerical data:

| f = 1.0, | β = 40X, | N.A = 0.7, | W.D = 0.1638 |
|---|---|---|---|
| $r_1 = -0.5775$ | | | |
| | $d_1 = 1.0304$ | $n_1 = 1.78472$ | $\nu_1 = 25.71$ |
| $r_2 = -0.9776$ | | | |
| | $d_2 = 0.0243$ | | |
| $r_3 = -127.6624$ | | | |
| | $d_3 = 0.6167$ | $n_2 = 1.4925$ | $\nu_2 = 81.90$ |
| $r_4 = -1.6702$ | | | |
| | $d_4 = 0.0243$ | | |
| $r_5 = -13.3607$ | | | |
| | $d_5 = 0.2872$ | $n_3 = 1.5213$ | $\nu_3 = 52.55$ |
| $r_6 = 1.6493$ | | | |
| | $d_6 = 0.9031$ | $n_4 = 1.4925$ | $\nu_4 = 81.90$ |
| $r_7 = -2.6376$ | | | |
| | $d_7 = 0.0341$ | | |
| $r_8 = -149.0899$ | | | |
| | $d_8 = 0.2434$ | $n_5 = 1.80518$ | $\nu_5 = 25.43$ |
| $r_9 = 2.1982$ | | | |
| | $d_9 = 0.6328$ | $n_6 = 1.4925$ | $\nu_6 = 81.90$ |
| $r_{10} = -3.2426$ | | | |
| | $d_{10} = 3.9939$ | | |
| $r_{11} = 1.9263$ | | | |
| | $d_{11} = 0.9516$ | $n_7 = 1.7495$ | $\nu_7 = 35.27$ |
| $r_{12} = 5.6938$ | | | |
| | $d_{12} = 0.3517$ | $n_8 = 1.6134$ | $\nu_8 = 43.84$ |
| $r_{13} = 1.1734$ | | | |
| | $f_1 = 1.412$ | $f_2 = -3360.713$ | |
| | $O_7 = 0.5885$ | $O_8 = 0.5623$ | | wherein the reference symbol f represents a focal length of the entire system, $r_1$ through $r_{13}$ represent radii of curvature of the respective surfaces of the lens component, $d_1$ through $d_{12}$ represent thicknesses of the respective lens elements and the airspaces therebetween, $n_1$ through $n_8$ represent refractive indices of the respective lens elements and $\nu_1$ through $\nu_8$ represent Abbe's numbers of the respective lens elements.

6. A microscope objective lens system according to claim 1 having the following numerical data:

| f = 1.0, | β = 40X, | N.A = 0.7, | W.D = 0.1629 |
|---|---|---|---|
| $r_1 = -0.5879$ | | | |
| | $d_1 = 1.1268$ | $n_1 = 1.78472$ | $\nu_1 = 25.71$ |
| $r_2 = -0.9712$ | | | |
| | $d_2 = 0.0242$ | | |
| $r_3 = -3.4741$ | | | |
| | $d_3 = 0.5324$ | $n_2 = 1.497$ | $\nu_2 = 81.60$ |
| $r_4 = -1.7216$ | | | |
| | $d_4 = 0.0242$ | | |
| $r_5 = 3.4827$ | | | |
| | $d_5 = 0.3555$ | $n_3 = 1.5213$ | $\nu_3 = 52.55$ |
| $r_6 = 1.4761$ | | | |
| | $d_6 = 0.9526$ | $n_4 = 1.497$ | $\nu_4 = 81.60$ |
| $r_7 = -2.7742$ | | | |
| | $d_7 = 0.0339$ | | |
| $r_8 = -15.9252$ | | | |
| | $d_8 = 0.2420$ | $n_5 = 1.7847$ | $\nu_5 = 26.22$ |
| $r_9 = 1.6468$ | | | |
| | $d_9 = 0.6292$ | $n_6 = 1.497$ | $\nu_6 = 81.60$ |
| $r_{10} = -4.3063$ | | | |
| | $d_{10} = 4.0024$ | | |
| $r_{11} = 1.9340$ | | | |
| | $d_{11} = 0.9124$ | $n_7 = 1.7495$ | $\nu_7 = 35.27$ |
| $r_{12} = -80.2098$ | | | |
| | $d_{12} = 0.2986$ | $n_8 = 1.6134$ | $\nu_8 = 43.84$ |
| $r_{13} = 1.1830$ | | | |
| | $f_1 = 1.332$ | $f_2 = 79.840$ | |
| | $O_7 = 0.5885$ | $O_8 = 0.5623$ | | wherein the reference symbol f represents a focal length of the entire system, $r_1$ through $r_{13}$ represent radii of curvature of the respective surfaces of the lens component, $d_1$ through $d_{12}$ represent thicknesses of the respective lens elements and the airspaces therebetween, $n_1$ through $n_8$ represent refractive indices of the respective lens elements and $\nu_1$ through $\nu_8$ represent Abbe's numbers of the respective lens elements.

* * * * *